(12) United States Patent
Gamand

(10) Patent No.: US 8,035,565 B2
(45) Date of Patent: Oct. 11, 2011

(54) ANTENNA DEVICE AND RF COMMUNICATION EQUIPMENT

(75) Inventor: Patrice Gamand, Douvres la Delivrande (FR)

(73) Assignee: NXP B.V., Eindhoven (NL)

( * ) Notice: Subject to any disclaimer, the term of this patent is extended or adjusted under 35 U.S.C. 154(b) by 513 days.

(21) Appl. No.: 12/293,415

(22) PCT Filed: Mar. 14, 2007

(86) PCT No.: PCT/IB2007/050864
§ 371 (c)(1),
(2), (4) Date: Sep. 17, 2008

(87) PCT Pub. No.: WO2007/107923
PCT Pub. Date: Sep. 27, 2007

(65) Prior Publication Data
US 2009/0102728 A1    Apr. 23, 2009

(30) Foreign Application Priority Data
Mar. 17, 2006  (EP) .................................... 06300244

(51) Int. Cl.
*H01Q 1/24*    (2006.01)
(52) U.S. Cl. .................. 343/702; 343/700 MS; 343/767
(58) Field of Classification Search ........... 343/700 MS, 343/702, 767
See application file for complete search history.

(56) References Cited

U.S. PATENT DOCUMENTS

| | | | | |
|---|---|---|---|---|
| 5,041,839 A | * | 8/1991 | Rees | 343/700 MS |
| 5,767,808 A | * | 6/1998 | Robbins et al. | 343/700 MS |
| 5,903,239 A | | 5/1999 | Takahashi et al. | |
| 6,329,655 B1 | * | 12/2001 | Jack et al. | 250/338.1 |
| 6,842,144 B2 | * | 1/2005 | Guo et al. | 343/700 MS |
| 6,989,790 B1 | * | 1/2006 | Rees | 343/700 MS |
| 7,838,328 B2 | * | 11/2010 | Isa | 438/99 |

FOREIGN PATENT DOCUMENTS

| | | |
|---|---|---|
| EP | 1494167 A | 1/2005 |
| EP | 1580837 A1 | 9/2005 |

OTHER PUBLICATIONS

Zhang Y P; "Recent Advances in Integration of Antennas on Silicon Chip and on Ceramic Package". Conf-2005 IEEE International Workshop on Antenna Technology: Small Antennas and Novel Metamaterials, Mar. 7-9, 2005, Singapore, pp. 151-154. IEEE Piscataway, NJ, USA.

* cited by examiner

*Primary Examiner* — David G Phan

(57) ABSTRACT

An antenna device (AD) for a RF communication equipment, comprises i) a substrate (S) comprising front (FS) and back (BS) sides, ii) a planar antenna element (AE) fixed to the substrate back side (BS), iii) a group of at least one component (G1) fixed to the substrate front side (FS), in an area located under the antenna element (AE), and connected to the antenna element (AE) through at least a first connecting means (VH 1) passing through the substrate (S), and a low resistivity layer (BL) buried into the substrate (S) for connecting to ground in order to isolate at least the group of component(s) from electromagnetic disturbances induced by the antenna element (AE).

17 Claims, 2 Drawing Sheets

ANTENNA DEVICE AND RF COMMUNICATION EQUIPMENT

TECHNICAL FIELD

The present invention relates to the domain of radiofrequency (RF) communication equipments (or modules), and more precisely to the antenna device comprised in, or connected to, such RF communication equipments (or modules).

BACKGROUND ART

By "communication equipment" one means here any equipment, mobile or not, adapted to receive and/or transmit RF signals to and/or from mobile (or cellular) and/or WLAN and/or broadcast and/or positioning networks, and notably a mobile phone (for instance a GSM/GPRS, UMTS or WiMax mobile phone), a personal digital assistant (PDA), a laptop, a PCMCIA card (giving a communication functionality to an equipment), a USB dongle (for use in computers and their peripherals), a satellite positioning device (for instance a GPS one), or a microwave receiver for radars (collision avoidance car radars, for instance), a television receiver, a RFID (RF IDentifier) device, or a NFC (Near Field Communication) device.

Moreover, by "antenna device" one means here a device comprising a substrate, a planar antenna element, and at least a passive component (for instance a LC matching filter and/or decoupling capacitor(s)) and/or at least an active component (for instance a low noise receiver) connected to the antenna element through connecting means.

When an antenna device is intended for working at very high frequency, its (radiating) antenna element may have dimensions in the order of few millimeters (typically a quarter of the working wavelength). So, the antenna element can be fixed to, or integrated into, a carrier which can be a semiconductor or semi-insulating substrate. Unfortunately, when the antenna element is working it induces electromagnetic disturbances which are harmful to the working of the active and/or passive components that are in its vicinity. Therefore, the antenna element and the active and/or passive components must be spaced apart at a distance which renders the antenna electromagnetic disturbances negligible. Consequently, the antenna device is bulky and its antenna element and the associated electronic complex function(s) cannot be integrated into the same carrier.

It has been recently proposed to integrate an antenna element of the quasi-Yagi type and some associated integrated components on top of the same side of a low resistivity silicon multilayer substrate. The integrated components are partly separated from the antenna by a truncated layer which is defined in the substrate and is connected to the antenna element. Such a solution is described in the document of Zhang Y. P. "Recent advances in integration of antennas on silicon chip and on ceramic package", CONF-2005 IEEE International Workshop on Antenna Technology: Small Antennas and Novel Metamaterials, 7-9 Mar. 2005—Singapore, IEEE Piscataway, N.J., USA. This solution allows partial isolation of some components from the antenna radiations. But, it requires a complex and expensive process which is not adapted to manufacturing of chips and antennas that are commonly used in consumer equipments. Moreover, only one face of the carrier (or substrate) is used. So there is no possibility to get a real miniaturised integrated antenna device except if the carrier (or substrate) dimensions are very large.

DISCLOSURE OF INVENTION

So, the object of this invention is to improve the situation and at least to allow a reduction of the antenna device dimensions.

For this purpose, it provides an antenna device for a RF communication equipment, comprising a substrate with front and back sides, a planar antenna element and a group of at least one component connected to the antenna element.

This antenna device is characterised in that:

- its planar antenna element is fixed to the substrate back side,
- the group of at least one component is fixed to (i.e. integrated in or defined in or else attach to) the substrate front side, in an area located under the antenna element, and connected to the antenna element through at least a first connecting means passing through the substrate, and
- it comprises a low resistivity layer buried into the substrate for connecting to ground in order to isolate the group of at least one component from the electromagnetic disturbances that are induced by the antenna element.

The IC assembly according to the invention may include additional characteristics considered separately or combined, and notably:

- its buried layer preferably extends over a surface which is at least equal to the surface occupied by the antenna element, and its antenna element is fully located over its buried layer;
- its buried layer may be arranged in order to act as a reflector for the antenna element;
- its buried layer can also be used as ground connection for a component.

For instance, it may define a part of at least one component of the group;

- its antenna element is a radiating element;
  - this radiating element may be a slot antenna element comprising at least one slot and having first and second terminals respectively connected to the group of components and to the buried layer through the first connecting means and a second connecting means passing through the substrate;
  - in a first variant, the radiating element may be a patch antenna element;
  - in a second variant, the radiating element may be a transmission line;
- the first and/or second connecting means may be via holes;
- it may comprise at least one additional active component (for instance a radio communication component, such as an active low noise receiver (or down converter), or a transmitter, or else a transceiver) fixed to the substrate front side and electrically connected to at least one component of the group;
- in a variant at least one component of the group may define a radio communication component, such as an active low noise receiver (or down converter), or a transmitter, or else a transceiver, for instance;
- at least one component of the group may define a low loss matching filter arranged to match the output impedance of the antenna element to an input of the active low noise receiver, and/or at least one component of the group may define at least partly supply decoupling functions with (integrated) decoupling capacitor(s);
- it may comprise connection pads fixed to the substrate front side, electrically connected to the buried layer and to at least one of the components of the group and/or to at least one of the active components for connecting to a printed circuit board (PCB) of the RF communication equipment;

its substrate may be a high resistivity substrate, for instance made of silicon or another semi insulating III/V material;

its buried layer may be made of doped silicon;

its buried layer may be realised by means of a passive integration process.

The invention also provides a RF communication equipment comprising an antenna device such as the one above introduced. Such a RF communication equipment may be a mobile phone, a wireless portable device, a RFID device, or a NFC device, for instance.

BRIEF DESCRIPTION OF DRAWINGS

Other features and advantages of the invention will become apparent on examining the detailed specifications hereafter and the appended drawings, wherein.

The appended drawings may not only serve to complete the invention, but also to contribute to its definition, if need be.

MODES FOR CARRYING OUT THE INVENTION

Figure 1:
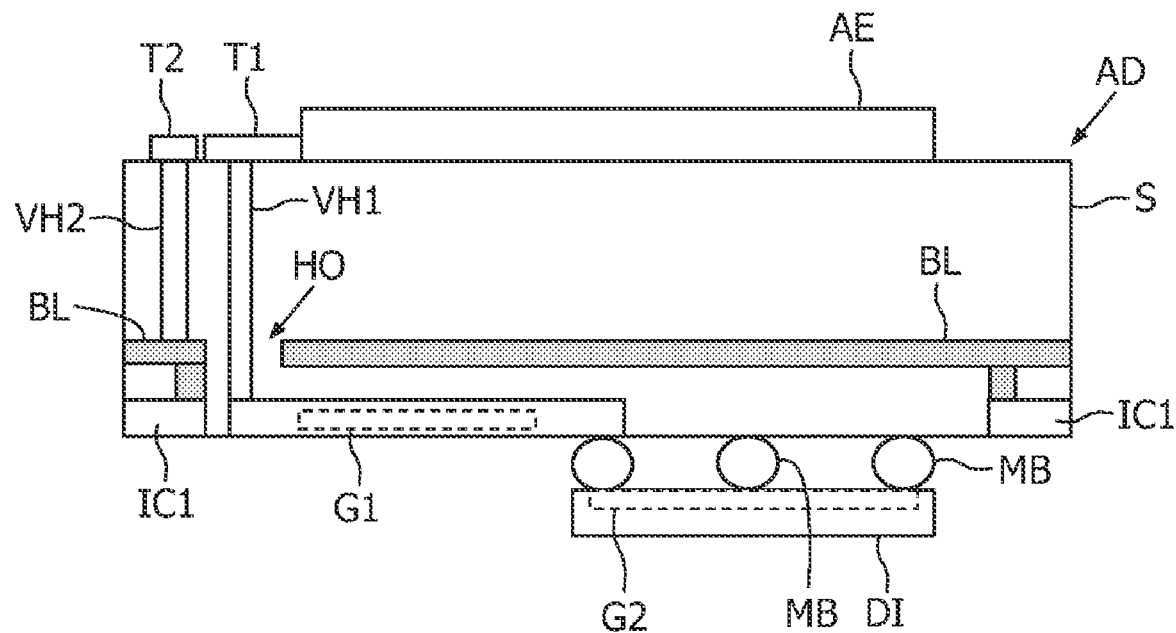
FIG. 1 schematically illustrates a first example of antenna device according to the invention, in a cross section view, FIG. 2 schematically illustrates a first example of slot antenna element intended for the first example of antenna device shown in FIG. 1, FIG. 3 schematically illustrates a second example of patch antenna element intended for a second example of antenna device according to the invention, FIG. 4 schematically illustrates, in a front side plane view, a second example of antenna device according to the invention, comprising a patch element such as the one illustrated in FIG. 3.

Reference is initially made to FIG. 1 to introduce the main characteristics of an antenna device AD according to the invention.

In the following description it will be considered that the antenna device AD is intended to be part of a RF communication equipment, such as a mobile phone, for instance. But it is important to notice that the invention is not limited to this type of RF communication equipment.

Indeed the invention may apply to any RF communication equipment or module, mobile or not, adapted to receive and/or transmit RF signals to and/or from mobile (or cellular) and/or WLAN and/or broadcast and/or positioning networks and/or radars and/or RFID systems. So it could be also a personal digital assistant (PDA), a laptop, a satellite positioning device (for instance a GPS one), a dongle, a television receiver, a microwave receiver for radars (avoidance collision car radars, for instance), a RFID device, or a NFC device.

The invention may be notably used in consumer equipments (or modules) and more especially in wireless equipments (or modules). Moreover, the invention may be provided in a dongle, for instance of the USB type, intended for adding functionality to personal computers or any other devices with USB connectors.

As illustrated in FIG. 1 an antenna device AD according to the invention comprises at least a substrate S, a planar antenna element AE, at least one group of at least one component G1 and a low resistivity layer BL.

The substrate S comprises a front side FS and a back side BS opposite to the front side FS. This substrate S has preferably a high resistivity. So, it may be made of silicon or another semi-insulating substrate like a III/V material, for instance.

The planar antenna element AE is fixed to the substrate back side BS. By "fixed to" one means here either attached to the substrate back side BS or defined (or integrated or else patterned) into or on top of the substrate back side BS.

Figure 2:
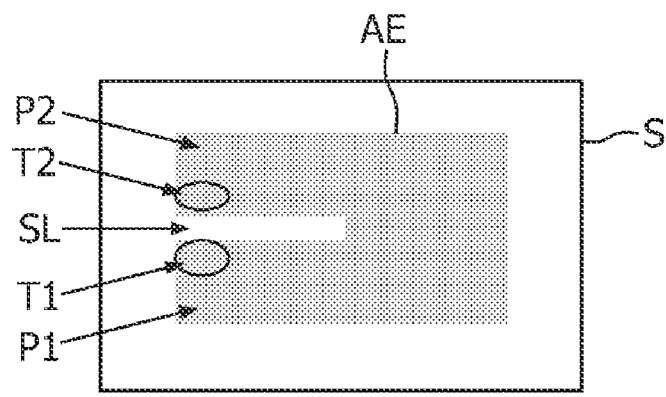

As it is illustrated in FIG. 2, the planar antenna element AE may be a slot antenna element comprising at least one slot SL. In the illustrated example the shape of the slot SL is rectangular. But this is not mandatory. Indeed, the slot SL may be straight or folded (for instance it may have a L shape). Moreover, more than one slot SL may be defined into the antenna element AE, for instance in order to increase the working bandwidth.

In this case, the antenna element AE comprises first P1 and second P2 parts defining two opposite sides of the slot SL and respectively connected to first T1 and second T2 terminals. These first T1 and second T2 terminals define ports which are respectively coupled to the group of components G1 and to the low resistivity layer BL through first VH1 and second VH2 connecting means, such as via holes (or vias), passing through the substrate S. The first via hole VH1 is arranged in order either to transmit the signals received by the antenna element AE to the group of components G1 for processing purpose, or to transmit the signals output by the group of components G1 to the antenna element AE for radiating purpose. The second via hole VH2 is arranged in order to couple the antenna element AE to the ground to which is intended to be connected the low resistivity layer BL.

In a first variant, the antenna element can also be a simple transmission line, with or without meander, acting as a radiating antenna element.

Figure 3:
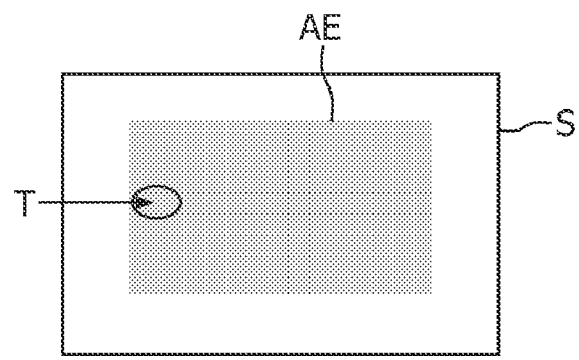

In a second variant, the planar antenna element AE may be a patch antenna element, such as the one illustrated in FIG. 3. In this case, the antenna element AE comprises only one terminal T defining a port which is coupled to the group of components G1 through a connecting means VH1, such as via hole (or vias), passing through the substrate S. This via hole VH1 is then arranged in order either to transmit the signals received by the antenna element AE to the group of components G1 for processing purpose, or to transmit the signals generated by the group of components G1 to the antenna element AE for radiating purpose. The antenna element AE is capacitively coupled to ground through the low resistivity layer BL.

The group of component(s) G1 is fixed to the substrate front side FS in an area which is located under the antenna element AE. By "fixed to" one means here either attached directly or indirectly to the substrate front side FS or defined (or integrated or else patterned) into or on top of the substrate front side FS.

In the example illustrated in FIG. 1, the group of component(s) G1 is integrated (i.e. defined) into the substrate S at the level of its front side FS. This group G1 is electrically connected to the first via hole VH1 (itself connected to the antenna element AE). In this example other components IC1 have also been integrated into the substrate S in order to carry out some chosen functionalities. For instance, these components may be simple metallisation(s) intended for connecting the group G1 to one or several contact(s) for external connection purpose.

For instance, the group of component(s) G1 defines a low loss matching filter. Such a filter may be constituted by LC lumped elements arranged to match the output impedance of the antenna element (when it works as a signal receiver) to the input of an active low noise receiver (or down converter) G2, for instance. So and as illustrated, the group of component(s)

G1 is electrically coupled to the active low noise receiver (or down converter) G2. For instance, the matching filter G1 presents a loss smaller than 3 dB.

In a variant, the group of component(s) G1 may define at least a part of one or more (integrated) decoupling capacitor(s) intended for implementing supply decoupling functions.

In another variant, the group of component(s) G1 may define a low loss matching filter and one or more (integrated) decoupling capacitor(s).

The active low noise receiver (or down converter) G2 comprises a low noise amplifier (LNA), a mixer intended to receive a local oscillator signal and a filter. For instance, the active low noise receiver (or down converter) G2 offers a gain equal to 15 dB, a noise factor smaller than 6 dB, and down converts the high frequency signals (received by the antenna element AE) into intermediate frequency (IF) signals (for instance zero IF, or few MHz IF, or else few GHz IF).

In the example illustrated in FIG. 1, the active low noise receiver (or down converter) G2 is defined (or integrated) into a die DI, which is fixed (i.e. attached) to the substrate front side FS through connecting means such as soldered conductive bumps (or micro-balls) MB, and is electrically coupled to the group of components G1, possibly through at least one conductive bump MB.

For instance, the die is made of silicon or III/V substrate.

It is important to notice that in a variant of embodiment at least one component of the group G1 may define the active low noise receiver (or down converter) described above. Moreover, this active low noise receiver (or down converter) may be connected to one or several other components of the group G1 defining the low loss matching filter described above and/or a part of at least one decoupling capacitor, for instance. In this case the group G1 can be defined into a die which is attached to the substrate front side FS in an area which is located below the low resistivity layer BL.

The low resistivity layer BL is buried into the substrate S and intended to be connected to ground to define a ground plane capable of electromagnetically isolating at least the group of components G1 (and possibly one (or more) other active or passive component(s), such as the active low noise receiver (or down converter) G2, for instance) from the electromagnetic disturbances induced by the antenna element AE.

For instance, the buried layer BL is made of doped silicon. It can be realised by means of a silicon passive integration process (or more generally a silicon integrated circuit process).

The buried layer BL can be used to form at least a part of at least one component of the group of component(s) G1. For instance, the buried layer BL may define one grounded (lower) electrode of a decoupling capacitor whose associated (upper) electrode is defined by one component of the group G1.

In order to optimize the electromagnetic isolation of the components (G1, G2) that are fixed to the substrate front side FS, the buried layer BL extends over a surface which is at least equal to (and preferably greater than) the surface occupied by the antenna element AE, while in the same time the antenna element AE is fully located over the buried layer BL. The components (G1, G2) being located under the antenna element AE, the buried layer BL acts as an electromagnetic screen for these components (G1, G2).

Moreover, the buried layer BL may be arranged to act as a reflector for the antenna element AE, especially when it is a patch antenna element such as the one illustrated in FIG. 3.

More, as illustrated in FIG. 1 the buried layer BL comprises at least an opening (or hole) HO in order to allow the crossing of the via hole VH1 connecting the antenna element AE to the group of component(s) G1.

Figure 4:
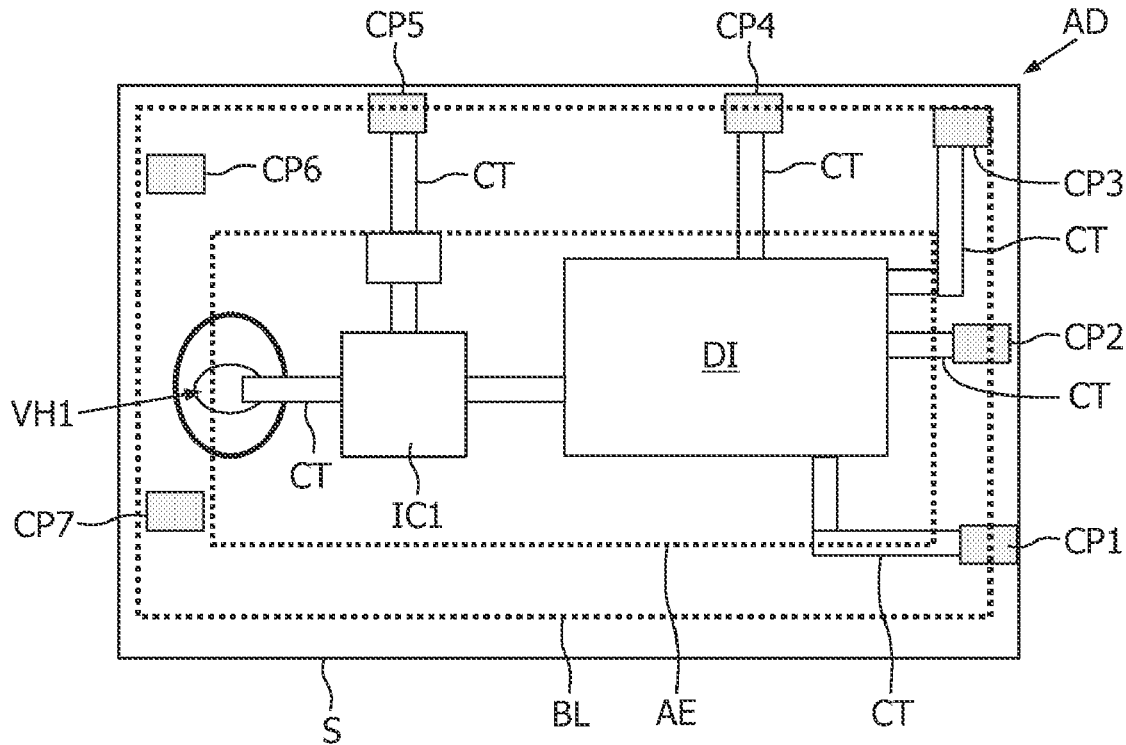

As illustrated in FIG. 4, several connection pads CPi (here i=1 to 7) may be defined onto the substrate front side FS. Some of these connection pads (CP1-CP5) are connected to the components G1 and G2 through conducting tracks CT, some others (CP6, CP7) are directly connected to a via hole which is connected to the buried layer BL. These connection pads CPi are intended to be connected to terminals of a printed circuit board PCB, for instance.

For instance, connection pad CP1 is intended to be connected to a supply terminal in order to (power) supply the active low noise receiver (or down converter) G2, connection pad CP2 is intended to be connected to an input terminal to feed it with IF signals down converted by the active low noise receiver (or down converter) G2, connection pad CP3 is intended to be connected to a terminal outputting the local oscillator signal used by the mixer of the active low noise receiver (or down converter) G2, and CP4 to CP7 are intended to be connected to ground terminals in order to provide a ground respectively for the active low noise receiver (or down converter) G2, the low loss matching filter G1 and the buried layer BL (two times). The electrical connection between the active low noise receiver (or down converter) G2 and the conducting tracks CT, connected to the connection pad CP1 to CP4 and to the low loss matching filter G1, is performed through the micro-balls MB.

With such an example of arrangement, the antenna element AE receives high frequency radio signals and transmits them to the low loss matching filter G1 through the via hole VH1. Then the low loss matching filter G1 transmits the received signals to the active low noise receiver (or down converter) G2 which down converts them into intermediate frequency signals and transmits them to the connection pads CP2 (through a micro-ball MB and the associated conducting track CT) in order they could be process into the PCB.

It is important to notice that the invention is not limited to this example of arrangement adapted to signal reception. For instance, it may be used also for transmission applications, notably.

For instance, if the antenna device AD is intended for working at 24 5 GHz (which corresponds to a quarter wavelength approximately equal to 5 mm), one can use:
- a silicon substrate S with a length approximately equal to 6 mm, a width approximately equal to 6 mm, a thickness approximately equal to 350 μm and a permittivity (εr) equal to 11,
- a doped silicon buried layer BL with a length approximately equal to 5.8 mm, a width approximately equal to 5.8 mm, a thickness comprised between 1 and 5 μm, and more preferably between 1 and 2 μm,
- a patch antenna element AE having a length approximately equal to 5 mm, or a slot antenna element AE having a length approximately equal to 5 mm, or a transmission line which acts as an antenna element, and
- a low loss matching (LC) filter G1 connected to a low noise receiver (or down converter) G2 defined onto an active die with a length approximately equal to 1 mm and a width approximately equal to 1 mm.

As the antenna element and components, which define one or more electronic complex function(s), can be integrated into a same carrier (or more precisely on the back and front sides of the substrate), it is now possible to produce antenna devices in the form of System in Package (SiP).

Moreover, as the size of the antenna device according to the invention mainly depends on the application frequency, this antenna device is well fitted to microwave and millimeter wave applications and may further comprise miniaturized sensors because such sensors can work without being electromagnetically disturbed by the antenna element.

The invention is not limited to the embodiments of antenna device and RF communication equipment (or module) described above, only as examples, but it encompasses all alternative embodiments which may be considered by one skilled in the art within the scope of the claims hereafter.

Thus, in the preceding description it has been described an example of embodiment of an antenna device according to the invention in which the group of component(s) (G1) defines at least a low loss matching filter and the additional active component (G2) defines at least an active low noise receiver. But, generally speaking, at least one component of the group (G1) or a possible additional active component (G2) may define a radio communication component, such as an active low noise receiver (or down converter), or a transmitter, or else a transceiver, for instance.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

The invention claimed is:

1. An antenna device for a RF communication equipment, comprising a substrate comprising front and back sides, a planar antenna element and a group of at least one component connected to said antenna element, characterised in that said planar antenna element is fixed to said substrate back side, in that said group of at least one component is fixed to said substrate front side, in an area located under said antenna element, and connected to said antenna element through at least a first connecting means passing through said substrate, and in that it comprises a low resistivity layer buried into said substrate for connecting to ground to isolate at least said group of component(s) from electromagnetic disturbances induced by said antenna element, wherein said antenna element is a slot antenna element comprising at least one slot and having first and second terminals respectively connected to said group of at least one component and to said buried layer through said first connecting means and a second connecting means passing through said substrate.

2. Antenna device according to claim 1, wherein said buried layer extends over a surface which is at least equal to the surface occupied by said antenna element, and in that said antenna element is fully located over said buried layer.

3. Antenna device according to claim 1, wherein said buried layer is arranged in order to act as a reflector for said antenna element.

4. Antenna device according to claim 1, wherein said buried layer is part of at least one component of said group.

5. Antenna device according to claim 1, further comprising at least one additional active component fixed to said substrate front side and electrically connected to at least one component of said group.

6. Antenna device according to claim 5, wherein said additional active component is a radio communication component.

7. Antenna device according to claim 1, wherein at least one component of said group defines a radio communication component.

8. Antenna device according to claim 1, wherein said radio communication component is an active low noise receiver.

9. Antenna device according to claim 1, wherein said radio communication component is a transmitter.

10. Antenna device according to claim 1, wherein said radio communication component is a transceiver.

11. Antenna device according to claim 1, further comprising connection pads (CPi) fixed to said substrate front side, electrically connected to said buried layer and to at least one component of said group and/or to at least one of said active components and intended to be connected to a printed circuit board of said RF communication equipment.

12. Antenna device according claim 1, wherein said substrate is a high resistivity substrate.

13. Antenna device according to claim 12, wherein said substrate is made of material chosen in a group comprising at least silicon and semi insulating III/V materials.

14. Antenna device according to claim 1, wherein said buried layer is made of doped silicon.

15. Antenna device according to claim 1, wherein said buried layer is realized by means of a passive integration process.

16. RF communication equipment, comprising an antenna device according to claim 1.

17. An antenna device for a RF communication equipment, comprising a substrate comprising front and back sides, a planar antenna element and a group of at least one component connected to said antenna element wherein at least one component of said group defines a low loss matching filter arranged to match an output impedance of said antenna element to an input of said active low noise receiver and/or at least one component of said group defines at least a part of at least one decoupling capacitor, characterised in that said planar antenna element is fixed to said substrate back side, in that said group of at least one component is fixed to said substrate front side, in an area located under said antenna element, and connected to said antenna element through at least a first connecting means passing through said substrate, and in that it comprises a low resistivity layer buried into said substrate for connecting to ground to isolate at least said group of component(s) from electromagnetic disturbances induced by said antenna element.

* * * * *